United States Patent Office 3,216,240
Patented Nov. 9, 1965

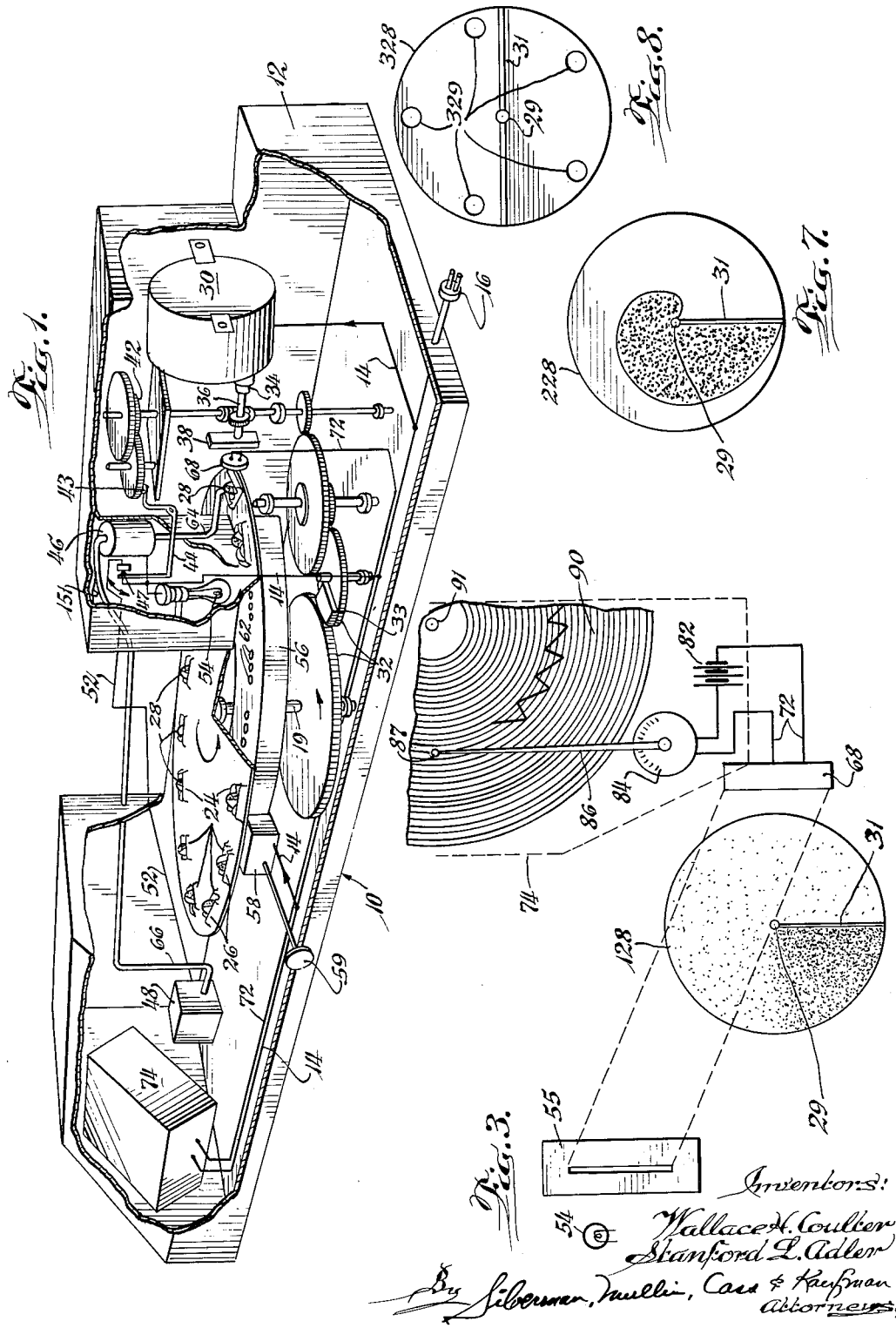

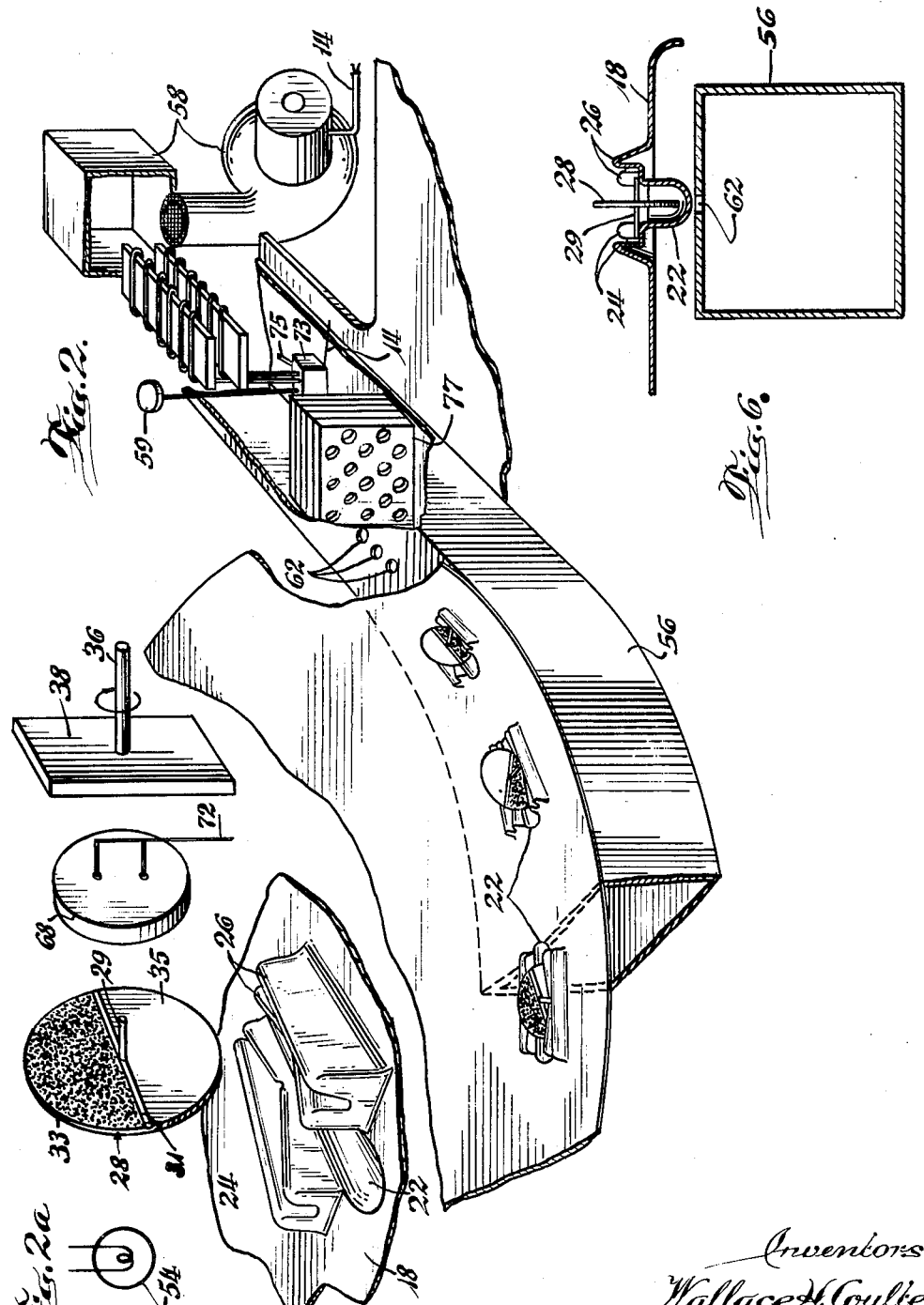

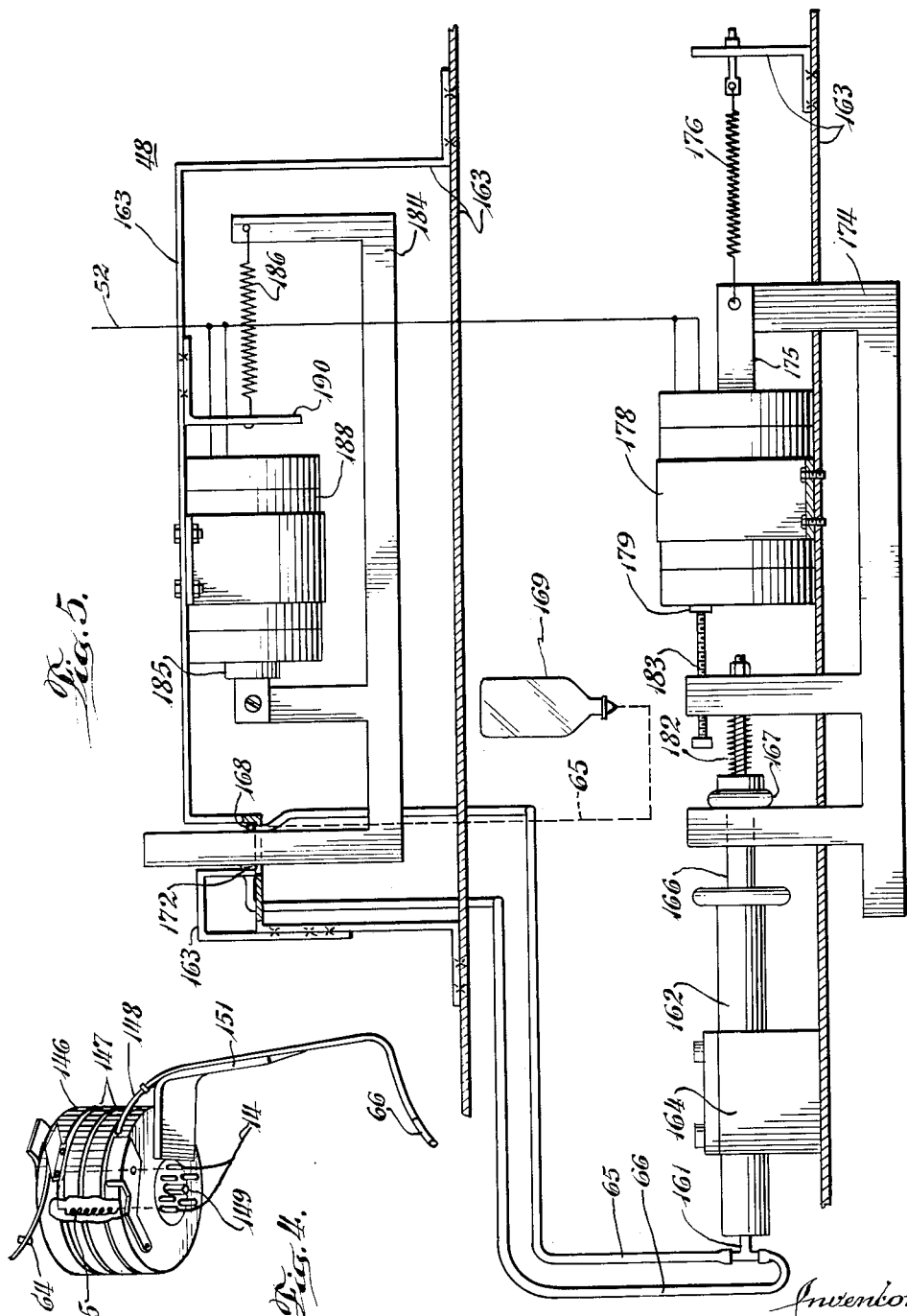

3,216,240
AUTOMATIC COAGULOMETER APPARATUS
Stanford L. Adler, Opa Locka, and Wallace H. Coulter, Miami Springs, Fla., assignors to Coulter Electronics, Inc., Hialeah, Fla., a corporation of Illinois
Filed Aug. 30, 1962, Ser. No. 220,526
31 Claims. (Cl. 73—53)

This invention relates generally to apparatus for measuring the coagulation rate of fluid samples and more particularly to apparatus for measuring the time for samples of blood fluid to pass from a normal viscosity state to a coagulated state.

Most important to a physician in his treatment of many ailments is a knowledge of the clotting characteristics of a patient's blood. In other technological fields, typically in the petroleum processing industry, it is important to know the variation of the viscosity characteristics of a fluid with passage of time, change of temperature, or the like.

In the case of blood, however, this need for accurate knowledge is dramatized by the human life involved and by the many complexities which affect the behavior of a blood sample. In the past, determination of the clotting ability of blood has been a laborious process performed by an individual who achieved competence only after substantial training and experience. Even then, the ability of the trained human technician to make uniform determinations of blood clotting time was inhibited in large measure by personal behavior variations by various fluctuations in the physical environment of the tests, and by the tedious nature of the blood sample tests themselves.

The testing of the coagulation rate of blood samples by an individual technician has been standardized in the past to the point of acquiring a distinctive name, the Prothrombin Time test. In conducting this test a predetermined amount of blood plasma was separated from the other blood constituents, corpuscles and the like. Thereafter this blood plasma was held, as near as could be, at body temperature and a pre-assigned amount of an additional reactant fluid was added. This reactant fluid is known as thromboplastin. This reactant fluid acts to coagulate the plasma and straightforward measurement of time from the addition of the reactant to the coagulation of the combined fluid has become known as the Prothrombin Time. This Prothrombin Time has become established as a measure of the coagulation ability of the blood sample tested.

Clearly this labored procedure is expensive of the technician's time. Equally, it is clear, this Prothrombin Time test performed by an individual is subject to manifold inaccuracies, first, from simple human vagaries of the technician and second, from the difficulties of controlling all the environmental conditions which affect the conduct of this tedious, step by step testing of an individual sample.

Accordingly, it is a principal object of this invention to provide novel apparatus for rapid, accurate and automatic testing of a fluid sample.

It is a further object of the invention to increase the accuracy and reliability of blood fluid sample testing by establishing uniform environments for the testing of such plural samples.

It is a further object of the invention to increase the speed of blood fluid sample testing.

It is a further object of this invention to reduce the cost of blood fluid sample testing.

It is a further object of the invention to increase the accuracy of blood fluid sample testing.

These and other objects are accomplished in accordance with the invention in one illustrative embodiment by the employment of a thin plastic, rotatable carrier member having plural very thin walled bowls uniformly spaced about its periphery for holding a like plurality of fluid samples to be tested. This carrier member is driven in rotation by a constant speed, synchronous motor to move rotatably in steps corresponding to the angular spacing of the aforementioned bowls in the carrier member surface. This step by step rotation is accomplished by way of a well known gear train constructed and arranged to drive each of the plural bowls successively from one rotational station to a next test station and to dwell at these stations for an interval somewhat longer than the greatest coagulation time to be measured.

A metered amount of plasma sample to be tested at this test station is placed in one bowl substantially before the arrival of this bowl at the test station. A manifold is arranged underneath the carrier member to direct thermostatically controlled, heated air against the very thin walled undersurfaces of several of the aforementioned bowls during the dwell intervals at each of several stations, including the test station and those stations immediately preceding this test station. Thus, as an individual plasma sample arrives at the test station, this sample and the bowl within which it is contained are both held thermostatically at a carefully controlled body temperature.

A light source is positioned centrally with respect to the path of motion of the bowls for directing a light beam above and substantially parallel to the upper carrier surface. This beam is directed to pass immediately over the bowl containing the fluid to be tested, to the test station. As this beam arrives at the test station it is incident on a photocell which is responsive to the light beam for generating an electrical signal. This electrical signal is not a steady signal as might be expected from the steady light source. Instead, this electrical signal is an electrical wave of varying amplitude by virtue of modulation of the light beam, in accordance with the invention, as will be considered below.

The light beam passes through an at least partially transparent disc mounted for rotation about axle portions extending substantially parallel to the light beam. Raised shoulders about the bowl portions of the carrier member are provided to serve as mounting means for these axle portions. The partially transparent disc includes a patterned opaque portion which, when interposed between the light source and the photoelectric cell, causes variations in the electrical wave generated by the photocell. In this one illustrative embodiment of the invention, this pattern consists simply in having one half the disc rendered opaque by introduction of carbon black to one semicircle of the normally transparent material which makes up the disc.

The rotatable disc also includes a ferromagnetic armature which is no more than a simple iron wire segment embedded in the disc material along the dividing line between the two semicircular opaque and transparent disc portions. This embedded armature is provided for cooperation with a rotating magnetic field provided at the test station for driving the patterned disc in rotation about the aforementioned axle portions.

This rotating magnetic field is provided by a simple bar magnet mounted at the test station for rotation about an axis which extends substantially colinearly with the axis of rotation of the disc. Well known mechanical gear means are provided for rotating this bar magnet under drive of the aforementioned synchronous motor. In this fashion, the light transmitting disc is driven in rotation upon arrival at the test station to vary the light beam transmitted to the photocell.

At this test station there is also positioned an admitting arrangement for passing a metered quantity of reactant fluid, thromboplastin, to the fluid sample to be tested. It will be recalled that the bowl and the blood plasma fluid to be tested have been raised to a preassigned temperature by the introduction of thermostatically controlled air to the underside of the carrier member.

The additive reactant fluid is similarly raised to this same temperature by apparatus in accordance with this embodiment of the invention. A metered amount of the additive thromboplastin is supplied under signal control to the admitting arrangement upon arrival of the bowl at the testing station. The admitting arrangement includes a hollow brass cylinder having electrical heating coils interiorly disposed. The exterior surface of the cylinder is spirally grooved to receive plastic tubing of a length chosen in relation to the heat liberation ability of the coils and to the temperature of the supplied thromboplastin. Thus the metered amount of thromboplastin is raised in temperature exactly to the preassigned body temperature at which the bowl and plasma sample have been established upon arrival at the test station. This so controlled thromboplastin is thus injected into the bowl to react with the contained blood plasma toward bringing about coagulation.

It is here to be noted that the bowl is of such dimensions that the two metered amounts of fluid make for a combined fluid level which covers a substantial lower portion of the heretofore noted, rotatably mounted disc.

This metered sample of the reactant thromboplastin fluid is passed to the plastic tubing of the admitting arrangement from signal controlled metering apparatus in accordance with the invention. A suitably mounted metering syringe of the type well known in the art has an entrance-exit passage connected in T arrangement to first and second plastic tubing branches. The first tubing branch is connected to a thromboplastin reservoir, simply a bottle, and the second tubing branch is connected to the spirally wound tubing associated with the aforementioned admitting arrangement. These two branches pass by way of an electromagnetically operable, signal controlled, spring loaded, valve arrangement. The syringe plunger is correspondingly arranged in operating relationship with an electromagnetically operable, signal controlled, spring loaded operating frame.

Thus, in a relaxed situation, the first tubing branch is opened. The second is shut, and the syringe plunger is withdrawn, all under spring actuation. Accordingly the syringe is filled with a metered amount of thromboplastin.

As a control signal is applied for operating the above discussed relaxed arrangements, the first tubing branch is shut and the supply reservoir, the bottle, is isolated. The second tubing branch is opened and the syringe plunger is actuated to drive a metered amount of thromboplastin, through the heating and admitting arrangement priorly discussed, to the bowl positioned proximate the testing station. This control signal corresponds substantially with arrival of a particular fluid containing bowl at the test station.

Now the patterned, light transmitting disc rotates, substantially half immersed in the fluid mixture of plasma and thromboplastin. Light passing from the source to the photoelectric cell is modulated by the patterned opaque portions of the disc. This modulated light generates a correspondingly modulated electric wave from the photocell. Since the light modulating disc rotates in near synchronism with the synchronous motor driven magnet, an accurate time base is established in the electric wave from the photocell.

This wave is transmitted to well known record establishing apparatus for establishing a record of the electric wave variations. These wave variations are founded in the substantially constant speed rotation of the aforementioned light transmitting disc. Hence cessation of these rotations indicates the time of stoppage of the disc.

This stoppage coincides with solidification, or coagulation, of the fluid in which the disc rotates. Accordingly a time record is established of the interval between arrival of the plasma to be tested at the test station and the coagulation of this plasma sample.

Accordingly, it is a feature of the invention that a sample fluid carrier member is driven for interrupted rotation about an axis.

It is a further feature of the invention that plural, fluid retaining bowls are uniformly spaced in the carrier member upper surface about the aforesaid axis of rotation.

It is a further feature of the invention that the aforesaid bowls correspond in rotational spacing to the arc of uninterrupted rotation of the carrier member.

It is a still further feature of the invention that these fluid retaining bowls are thin for facilitating heat transfer from the undersurface of the carrier member to the fluid contained within the bowls.

It is a still further feature of the invention that a testing station is positioned with respect to the carrier member in correspondence with the interruption of rotation of said bowls.

It is a further feature of the invention that blower means are provided for establishing a uniform, preassigned temperature in a bowl carrier member portion and in fluid retained therein upon arrival of this bowl at a testing station.

It is a further feature of the invention that fluid admitting arrangements are disposed at said testing station for introducing a preassigned amount of reactant fluid to the bowl.

It is a further feature of the invention that the aforesaid admitting arrangements comprise means for heating admitted reactant fluid to a temperature corresponding to that of the aforementioned bowl and fluid to be tested.

It is a still further feature of the invention that patterned, light transmitting discs are respectively mounted for rotation in the plural bowl portions of the carrier member.

It is a still further feature of the invention that a source of light is centrally positioned with respect to an upper surface of said carrier member for directing a light beam substantially parallel to this carrier surface to the test station.

It is a further feature of the invention that a light responsive photocell is positioned at the testing station for generating an electrical wave in response to light signals from the source.

It is a further feature of the invention that the discs are arranged for rotation in a plane interposed between the source and the photocell.

It is a further feature of the invention that substantially a half portion of disc is positioned for immersion in fluid retained in the associated bowl portion of the carrier member.

It is a still further feature of the invention that the discs comprise an embedded, ferromagnetic member positioned transverse to said disc rotation axis.

It is a still further feature of the invention that a magnet is mounted for rotation at the testing station about an axis substantially corresponding to the axis of rotation of a proximately positioned one of discs.

These and other objects, features and advantages of the invention will be more clear and still other objects, features and advantages will become apparent from a consideration of the following brief description of an illustrative embodiment of the invention, shown in the drawings, and from a consideration of the appended claims.

In the drawings:

FIG. 1 is a partially sectioned, partially schematic, perspective view of automatic coagulometer apparatus constructed in accordance with the invention.

FIG. 2 is a partially sectioned, exploded diagrammatic view illustrating on a larger scale some of the principal components of apparatus constructed in accordance with the invention with somewhat more detail than can be seen in the view of FIG. 1.

FIG. 2a is a diagrammatic view illustrating other related components in a larger scale than that of FIG. 1.

FIG. 3 is a partially schematic, skeletal isometric drawing of an optical-electrical system constructed in accordance with the invention.

FIG. 4 is a perspective view of the heating portion of a metered fluid admitting arrangement constructed in accordance with the invention.

FIG. 5 is a functionally interconnected elevational view of two importantly operative fluid supply valve arrangements constructed in accordance with the invention.

FIG. 6 is a transverse sectional view of important fluid heating arrangement elements shown on a smaller scale in FIGS. 1 and 2.

FIG. 7 is a plan view of a patterned light transmitting disc for employment in the apparatus of the invention alternative to the similar discs shown in FIGS. 1, 2 and 3.

FIG. 8 is a plan view of still another patterned, light transmitting disc for alternative employment in the apparatus of the invention.

Before proceeding with detailed discussion of the illustrative embodiment of the invention, it may be well to consider the invention in broad aspect. Faced with the problem of measuring the coagulation characteristic of plural fluid samples rapidly and accurately, applicants first, provide a unitary carrier member for transporting such plural samples in a circular path. To avoid manual operations which have proven disadvantageous in the past, this carrier member comprises a plurality of peripherally positioned, depressed, thin bowls for transporting a like plurality of samples to be analyzed. In this fashion the apparatus becomes economical of manufacture and at the same time provides advantageous uniformity of environmental conditions for the conduct of tests on the several samples contained within the bowls.

Each bowl is associated with a pair of raised mounting portions or journals adapted to mount an axle in an orientation perpendicular to the axis of rotation of the carrier member. A disc for each bowl is constructed of substantially transparent material and comprises two oppositely extending axle portions for rotatable disposition in one of the aforementioned pairs of raised mounting portions associated with each of the plural bowls.

Portions of the disc comprise an opaque pattern. Thus, as a light beam is passed through the disc from a source to an exteriorly disposed photocell, this light beam variably excites the photocell in accordance with modulation imposed on the light beam by opaque portions of the disc. This variable excitation of the photocell gives rise to an electrical wave as the disc is rotated to impose variable modulation on the light beam. Clearly this electrical wave gives indication of the rotation speed of the disc.

The disc is driven in rotation by magnetic coupling from a bar magnet to a magnetically responsive member embedded in the disc. The bar magnet is driven at constant speed by a synchronous motor which is also coupled, by way of an appropriate well known gear arrangement, for rotating the carrier member by steps to position each of the plural bowls successively at a test station where the above discussed optical arrangements are located.

Upon arrival of each successive bowl at this test station an electrical signal is applied to a metering arrangement for applying a preassigned amount of reactant fluid to the fluid contained within the bowl. In the case of testing a blood plasma sample, this reactant fluid is one known as thromboplastin. This thromboplastin is applied by way of an admitting arrangement which includes a heating element. This heating element is arranged for heating the thromboplastin to the temperature of the bowl and plasma contained therein.

The bowl, itself, and the contained fluid, in this case blood plasma, are raised to a uniform temperature, the temperature of the human body, by the application of jets of heated air to the underside of the thin bowls at the testing station and at each of several preceding stations. Thus the tests are conducted in a uniform thermal environment.

In the case of blood plasma, the quantity of most interest is the time necessary for the viscosity of the blood to change from a normal value to a substantially infinite value as the blood coagulates. In other embodiments of the invention for testing inorganic fluids, it is clear, principles of the invention may be applied to measure qualities of fluids of less fragile nature than human blood. In the relatively complex problem of testing human blood coagulation, however, these principles are turned to remarkable account.

Referring now more particularly to the drawings, FIG. 1 is a partially sectioned, partially schematic, fragmentary perspective view of a coagulometer 10 constructed in accordance with the invention. The housings 12 for this coagulometer are substantially sectioned to reveal operating components contained therein.

For operation of this equipment power is supplied by way of an alternating current bus 14 adapted for connection to a convenient source of alternating current, not shown, by way of a well known plug 16.

A carrier member 18 is constructed of thin plastic sheeting material in a circular configuration and is mounted for rotation about a vertical axis on a shaft 19. A plurality of bowls 22 is uniformly spaced about the periphery of the carrier member as shown. Each bowl has associated therewith a raised inner and outer mounting portion 24 and 26, respectively, in the upper surface of the carrier member 18. These two bowl associated mounting portions are disposed on either side of the bowl and are arranged respectively along a radial line from the shaft 19 about which the carrier member rotates. The bowls are each advantageously very thin, say 0.020 (twenty thousandths) inch, for heat transfer purposes as will appear hereafter. Clearly the bowls and mounting portions may be economically and readily incorporated into the plastic carrier member by the employment of appropriate dies when the plastic is in a moldable condition. These bowls and mounting portions will be considered in more detail hereafter in connection with the discussion of FIG. 2.

A plurality of discs 28, corresponding in number to the bowls of the first mentioned plurality, comprise two oppositely arranged axle portions 29 adapted to be journaled for rotational mounting in the bowl mounting portions 24 and 26. These rotatably mounted disc axles are arranged radially from the axis of rotation of the carrier member and substantially in the upper surface thereof. Thus, the discs proper have, substantially, a lower half within the associated bowl and substantially an upper half extending above the carrier member upper surface.

The carrier member is driven in interrupted rotation by a constant speed, synchronous motor 30, of the type well known in the art, through a gear train 32. This gear train 32 includes a sector gear 33 for moving the carrier member periodically through an arc corresponding to the angular spacing of the bowls 22 of the first mentioned plurality. The sector gear, in this embodiment of the invention, is constructed to rotate the carrier member from one station to the next during a five second interval following a fifty-five second dwell interval. This dwell interval corresponds in length to tests to be performed by apparatus in accordance with the invention.

A second gear train 34, not illustrated in detail, is also driven by motor 30 to rotate a shaft 36. This shaft is substantially colinear with the axle portions 29 of that one disc 28, of the aforementioned plurality, which is positioned at a test station during a dwell period in the periodic movement of the carrier member 18. A simple bar magnet 38 is mounted on this shaft 36 for rotation therewith at a speed of sixty revolutions per minute.

This bar magnet is spaced apart from the carrier member 18 so that no mechanical or optical interference is imposed by this rotating magnet on the functioning of the carrier member and associated components. As will be seen in more detail hereafter, however, each of the discs 28 comprises a magnetically responsive member disposed transversely to the disc axles 29. That disc which is positioned at the station also is positioned in magnetically influenced proximity with the bar magnet. Thus magnetic induction effects between the responsive member and the rotating magnet urge the disc to rotate in synchronism with the magnet, if the disc is free to do so.

A third gear train 42 operates a switch mechanism 47 associated with an admitting arrangement 46 and an associated fluid supply metering system 48. This admitting arrangement and metering system will be considered hereafter in more detail. Suffice it now to say that, upon arrival of an individual bowl 22 at the test station, this third gear train acts through a cam 43, a linkage 44 and a diagrammatically illustrated switch 47 to supply a pulse of alternating current through lead 52 to the fluid supply 48. This pulse of current passes from lead 14 by way of linkage arm 44 and cam operated switch 47 to lead 52. It will be seen in FIG. 1 that connection is also made with lead 14 for supplying energizing power to a lamp 54 and to the admitting apparatus by way of linkage arm 44.

An air manifold 56, insofar as it appears in FIG. 1, includes groups of ports 62 in an upper surface. These groups of ports are spaced apart in correspondence with the spacing of the bowls 22 around the periphery of the carrier member 18. A blower-heater arrangement 58 is supplied with alternating current power from the lead 14, as shown, to drive air through substantially conventional heating coils to the manifold ports 62. The level to which these coils are heated, and hence, the level to which the air is heated is under control of a dial 59 which controls a conventional thermostat, not shown specifically in FIG. 1.

It will be recalled that the bowls 22 are very thin. Specifically, in this embodiment of the invention, the bowls are 0.020 inch thick. Thus, during dwell intervals, the several bowls positioned above the ports 62 are bathed in thermostatically heated air directed against the thin under surface. Accordingly, the bowls and contents are successively raised to a predetermined temperature as the carrier member 18 rotates to bring a particular bowl to the testing station.

As the bowl arrives at this testing station, gear train 42, it has been noted heretofore, provides a signal by way of lead 52 to deliver a preassigned amount of additive reactant fluid thromboplastin mixture, by way of tubing 66 to the admitting arrangement 46.

As will be seen hereafter in consideration of the structure of FIG. 4, this admitting arrangement comprises heating arrangements powered from the alternating current line 14. In this fashion, the thromboplastin which is applied by way of nozzle 64 for mixing in the bowl positioned at the testing station, is admitted to this bowl at a predetermined temperature. This preassigned temperature is, in this specific embodiment of the invention, the human body temperature of 98.6° F. This temperature corresponds, too, to the temperature at which the bowl 22 and contained plasma is maintained by flow of heated air from the manifold 56. Thus, the temperature of the fluid mixture in the bowl at the testing station is held constant at a predetermined, desirable temperature.

That disc 28 which is positioned at the testing station rotates in the temperature controlled, combined fluid under the magnetic influence of the rotating bar member 38. In the course of this rotation, light from a well known source 54 passes through transparent portions of the patterned disc 28 to strike a photocell 68 of the type well known in the art. Incidence of this light generates a modulated electrical signal wave for application to lead 72 and passage to a recording apparatus 74.

Now the disc 28 is urged to rotation at a constant rate by the constant rate rotating magnet 38. Further, as has been discussed, the disc 28 comprises a uniformly varying light transmitting pattern. Hence, under normal conditions, it might be expected that a uniform electrical wave might be applied to the lead 72 by the photocell 68 since the magnet 38 urges the disc 28 to rotate at a constant speed. This disc, however, rotates in a bath of fluid to be tested. Upon addition of the thromboplastin mixture by way of lead 66, the thromboplastin, blood plasma mixture becomes more and more viscous with the passage of time, in dependence upon the characteristic of the blood plasma itself. Accordingly, frictional drag is exerted on the disc 28 as it rotates in the fluid mixture contained within the bowl 22. Finally, as the fluid mixture coagulates, the disc stops rotating and the electrical wave in lead 72 becomes constant.

In the record apparatus 74, a record of the wave transmitted by the way of lead 72 is established on an appropriate record member which is moved at a controlled rate. Thus, as will be seen hereafter, this record indicates by an abrupt termination of the wave pattern transmitted by lead 72 the time interval between the start of the test when the disc 28 rotated freely in the fluid in the bowl 22, and the end of the test when this fluid coagulated to the point of stopping rotation of the disc 28.

Next, referring to FIG. 2 and the companion FIG. 2a, there is seen in partially sectioned, diagrammatic and isometric view, in the former figure, and in exploded, diagrammatic view, in the latter, important elements of the structure of FIG. 1. In both these FIGS. 2 and 2a, the scale of the drawings has been expanded substantially beyond that of FIG. 1 in order that important structural cooperation of these elements may be readily apparent.

Referring now particularly to the exploded arrangement of FIG. 2a, there is seen a light transmitting disc 28 having opposite axle portions 29 adapted for rotation in the raised mounting portions 24 and 26 which are associated with bowl 22. This bowl 22, it will be recalled, is impressed in peripheral portions of carrier member 18 by pressured application of dies of an appropriate configuration during appropriate periods of plasticity of the member 18 in the course of manufacture.

In FIG. 2a there is shown a magnetically responsive iron wire member 31 embedded in the material of the disc 28 diametrically of the disc and transverse to the axle portions 29. This magnetically responsive member 31 divides the disc 28 into two semi-circular portions having opposite optical characteristics. The left-hand semi-circular portion 33 is opaque, and the right-hand semi-circular portion of the disc 28, the portion 35, is transparent. As the bar magnet 38 is rotated under drive of the shaft 36, as indicated, the magnetic field of this bar member interacts with the member 31 to cause rotation of the disc 28. The light source 54, conveniently an incandescent lamp, directs light toward photocell 68 through the disc 28. It will be recalled that substantially one-half the disc 28 is immersed in fluid contained within bowl 22. As the disc 28 rotates, signals generated by the photocell 68 and applied to the lead 72 are periodically interrupted as the light from source 54 is periodically interrupted in passage to this photocell 68 by the opaque portion 33 of the disc 28. As the fluid coagulates to seize the disc, these periodic variations cease.

Looking particularly next to FIG. 2, it will be observed that, in this diagrammatic drawing, important structural elements are reversed in orientation for purposes of clarity in illustration. In this FIG. 2, interior structural elements of the manifold 56 and blower-heater 58 are shown. The blower itself is any one of many such well-known in the art for directing air to and through the manifold 56, as shown. Passage through this manifold leads to heating of the air by heating windings 71 of the type well-known in the art. These windings are supplied with energy from the alternating current line 14 by way of an adjustable thermostat 73 of the type well known in the art. This thermostat has a sensing element 75 for sensing the temperature of air flow thereby. The desired temperature for this thermostat is established by dial 59, shown heretofore in connection with the discussion of FIG. 1. Heated air flowing through the windings 71 passes by way of an air flow directing honeycomb 77 for eliminating turbulence and promoting orderly heat transfer through the under surfaces of the several bowls 22 illustrated.

In the sectioned end view of FIG. 6, there is seen the path of air for heating of the bowl 22. As shown, this path extends through the manifold 56 and outwardly through the plural ports 62. Only an illustrative one of these plural ports is shown in FIG. 6. In this end view of FIG. 6, the raised mounting portions 24 and 26 of carrier member 18 are also shown more clearly in relation to the illustrative disc 28 and its associated axle portions 29.

Turning next to FIG. 3, here there are shown detailed electro-optical structural elements for employment in the structure of FIG. 1. In this FIG. 3, there is shown a light source 54 associated with a collimating aperture 55 for directing a light beam through a partially transparent disc 128.

As appears from the drawing of FIG. 3, this disc 128 corresponds substantially to the alternative disc 28 considered heretofore. This important distinction exists, however. The opacity pattern imposed on the disc 128 varies substantially linearly from a starting radius, defined by the ferro-magnetic member 31, in a clockwise direction. This variation is from complete opacity to zero opacity, that is, to light transmittance.

Clearly, as the disc 128 rotates about axle portions 29, light incident on photocell 68 varies substantially linearly to the boundary defined by the ferromagnetic member 31 which is embedded in the disc 128. From the photocell 68, the electrical wave resulting from the light incident on photocell 68 is passed by way of lead 72, noted heretofore, to the record apparatus 74 indicated in dashed lines.

In this record apparatus, polarizing potentials for the photocell 68 are applied to lead 72 by way of a battery 82 which is connected in circuit with a galvanometer type movement 84 having an actuated arm 86 for variably moving the writing pen 87 on a record member 90. This record member, as illustrated, is scribed in circular fashion for movement about an axis 91. In the record apparatus 74 suitable drive means, not shown here but well-known to those skilled in the art, are provided for so driving the record member 90.

Turning next to the structure of the partially sectioned FIG. 4, here there is seen an important structural element of the admitting apparatus 46. This important structural element is the heater apparatus portion of this admitting apparatus 46. This heater apparatus comprises a brass cylinder 146 having spiral grooves 147 cut therein for retaining plastic tubing 148. This tubing is adapted for connection to the thromboplastin transfer tubing 66 considered heretofore.

The free terminal of this plastic tubing 148 is connected to the admitting nozzle 64, also noted heretofore. Centrally embedded in the brass cylinder 146 are plural heating windings, only one illustrative one, which windings 145 is shown connected by conventional tube socket 149 to the alternating current lead 14.

This cylinder is adapted for mounting to the coagulometer housing by an attached bar 151. The grooves 147 and the length of tubing 148 embedded therein are carefully calculated in relation to the heating ability of the heater element 149 for raising the temperature of fluid from the source 48 which is supplied to the admitting arrangement 46 by way of tubing 66. The mounting bar 151, by virtue of its connection to the housing 12, provides a heat sink to stabilize the temperature of fluid passing to the heating admitting arrangement 46 from the tubing 66. This connection of the bar 151 to the housing 12 is seen more clearly by reference to FIG. 1.

Turning next to FIG. 5, there are seen metering arrangements for supplying metered amounts of the reactant fluid, thromboplastin, to the admitting arrangement 46. As noted heretofore in connection with the discussion of FIG. 1, this fluid is supplied by way of the tube 66 from the fluid supply 48. In this elevation view there is shown a pair of reactant fluid passing tubes 65 and 66 connected in T fashion to an entrance-exit passage 161 associated with the barrel of a substantially conventional syringe 162. This syringe is fixedly mounted to foundation portions 163 of the fluid supply 48, as shown, by means of the mounting 164. The barrel of the syringe 162 is constructed for retaining a fixed amount of fluid upon withdrawal therefrom of a plunger 166 by a predetermined amount.

The fluid is supplied from a reservoir 169 which, in this case, is no more than an inverted bottle connected to plastic tube 65 by way of valving arrangement 168. For clarity of illustration, the tube 65 is shown in a sectioned end view in proximity to the valving arrangement 168 and is further illustrated as continuing to the reservoir 169 by way of dashed lines.

Similar pictorial arrangements are employed in connection with the companion plastic tube 66 which is shown also in sectioned end view in proximity to the valving arrangement 172. From this latter valving arrangement 172, it will be recalled, the plastic tube proceeds from the fluid supply apparatus 48 to the admitting arrangement 46. This latter connection is not illustrated in connection with the valving arrangement 172 to avoid unnecessary complication of the drawing.

Operating portions of the fluid supply apparatus are seen associated with the syringe 162 in the lower portion of FIG. 5. A frame member 174, as shown, has three upwardly extending arms, a left hand arm, a central arm, and a right hand arm. The left hand arm is slotted to receive a syringe plunger 166. An expanded end portion 167 of this plunger is urged against the left hand arm of the frame member 174 by a spring-shaft arrangement 182 in which the spring is compressed against the center arm of the frame member 174. A threaded member 183 is adjustably positioned in the center arm, as shown, to limit travel of the frame member to the right.

This limiting is accomplished by cooperation of the threaded member 183 with a stop plate member 179. This stop plate member is mounted, as shown, on an electromagnetic winding 178 which is fixedly mounted to the aforementioned foundation portions 163, as indicated.

This electromagnetic winding 178 is solenoidal in function, and has a central passage thereto for permitting free longitudinal travel of a ferromagnetic core member 175.

This core member is pivotally mounted to the frame member 174 as shown, and is drawn to the right by the tension spring 176 which is fixed to the foundation portions 163.

In this relaxed condition illustrated, the plunger 166 is withdrawn to the right, under tensioned urging of spring 176 by an amount limited by the adjustable threaded member 183. Thus the syringe 162 is filled with a metered amount of thromboplastin contained in the bottle 169 by way of tube 65 through valving arrangement 168 which, as shown, is in the open position.

Upon arrival of the bowl containing fluid to be tested at the test station, cam 43 acts through linkage 44 to direct a pulse of alternating current from lead 14 by way of switch 47 and lead 52 to energize the electromagnetic winding 178. The ferromagnetic core 175 is accordingly drawn to the left, against spring tension of the spring 176, into a central position within the winding 178. The frame member 174 accordingly follows the movement of this core member and drives the plunger 166 to the left by action of the spring shaft arrangement 182. This movement of the plunger 166 to the left, accordingly, applies fluid under pressure to the entrance-exit passage 161 of the syringe. As will be seen hereafter, valve 172 is opened by the same alternating current pulse appearing on lead 52 and valve 168 is shut. Accordingly, a metered amount of fluid is passed by way of tubing 66 through valve arrangement 172 and on to the admitting arrangement 46 for heating in passage to the bowl positioned at the test station.

Operation of the heretofore noted valving arrangements 168 and 172 becomes clear with reference to the elevation view shown in the upper portions of FIG. 5. Here a solenoidal winding 188 is connected to lead 52 as shown and is fixed to foundation portions 163 of the fluid supply 48. A core member 185 is mounted in pivotal connection to a central arm of frame member 184, corresponding substantially to the frame member 174. This core member 185 is capable of longitudinal motion within solenoidal winding 188. A right hand upwardly extending arm of the frame member 184 is connected by way of a tensioned spring 186 to a downwardly extending bracket 190 of the foundation portion 163. This tensioned spring, as shown, urges the frame member 184 to move to the left. In this left hand position the illustrated left hand, upward extending arm of the frame member 184 cooperates with a downwardly extending foundation portion to constitute a valving arrangement 172 for shutting off flow through the tubing branch 66.

The winding 188 is supplied with an alternating current pulse from lead 52 at the same time this pulse is supplied to winding 178. This current pulse causes the winding 188 to draw the core member 185 from left to right against the tension of the spring 186. This signal controlled movement of the frame member 184 causes the upwardly extending left arm of this member to open the valving arrangement 172 and to shut valving arrangement 168 by squeezing shut the tubing branch 65. Thus, in a deenergized condition, spring tension holds tubing branch 65 open to allow filling of the syringe 162 from the bottle 169. Upon application of an alternating current pulse to lead 52 for driving fluid from syringe 162, the thromboplastin supply bottle 169 is shut off by closure of valving arrangement 168. At this time fluid supply to the admitting arrangement 46 by way of lead 66 is opened, as valving arrangement 172 is opened.

In this fashion the metering arrangement of FIG. 5 acts under signal control to supply metered amounts of reactant thromboplastin fluid to the admitting arrangement 46, for heating and subsequent introduction to that bowl which is positioned at the testing station.

Turning next to FIGS. 7 and 8, there are seen in plan view two disc arrangements, alternative to those of FIGS. 2 and 3, for employment in the apparatus of FIG. 1. In FIG. 7 there is shown a patterned light transmitting disc 228 having an opaque portion which corresponds to a counter-clockwise spiral. Thus, as in the case of the disc 128, clockwise rotation of the disc 228, leads to a linear decrease of transmitted light until an abrupt increase of light transmittal is made at the magnetically responsive member 31.

In FIG. 8 there is shown a particularly simple but advantageous light transmitting disc 328. This disc 328 is constructed substantially of opaque material, but comprises, as illustrated, five circularly pierced portions 329 uniformly spaced and disposed about the circumference of the disc. Clearly as this disc 328 rotates, pulses of light will be incident upon photocell 68 and no other signals will appear upon the record member.

The invention has been described in one illustrative embodiment with some few particularly advantageous alternative structural elements for employment in this one described illustrative embodiment. Clearly, many varied alternative elements may be substituted in structures in accordance with the invention without departing from the spirit and the scope of the invention as set forth in the appended claims.

What it is desired to secure by Letters Patent of the United States is:

1. Coagulometer apparatus for measuring the coagulation rate of a fluid sample in air which comprises, a bowl member for containing a fluid sample to be measured, a disc member mounted for rotation relative to said bowl member and in contact with said sample contained therein, means magnetically coupled with and spaced from said disc member for urging said disc member to rotate at a constant rate in said fluid, the coupling being insufficient to continue rotating said disc member when said fluid sample coagulates, and sensing means spaced apart from said disc member for measuring the rate of said disc member rotation.

2. Coagulometer apparatus as set forth in claim 1 wherein said disc member comprises, a patterned light transmitting portion and said sensing means comprises a light source for applying light beam to said disc member and a light responsive means positioned oppositely of said disc with respect to said source for generating a time signal indicative of the variation rate imposed on the transmittal of said beam by said patterned light transmitting portion, whereby the increasing frictional seizure of said disc member by said sample as the sample coagulates is indicated.

3. Coagulometer apparatus for measuring the coagulation rate of a fluid sample which comprises, a bowl member for containing a fluid sample to be measured, a disc member mounted for rotation with respect to said bowl member in partially immersed frictional engagement with said fluid sample, rotating means magnetically coupled with and urging said disc member to rotate and means for deriving a signal indication of the change of the frictional engagement of said disc with said fluid sample as a measure of the increase in viscosity of said fluid sample.

4. Apparatus for testing the coagulation time of a fluid sample which comprises, a carrier member having a bowl portion for carrying the sample to be tested and journals adjacent said bowl portion, means for transporting said carrier member to bring said bowl portion into disposition at a test station, a disc having opposed axles rotatively mounted on said journals for partial immersion of said disc in the fluid sample, said disc having a light transmitting pattern and a magnetically responsive member disposed transverse of said axles, heating means for raising said bowl portion and fluid sample contained therein to a predetermined temperature in the course of transport to and while at said test station, rotating means magnetically coupled with an urging said disc to rotate at said test station, a light source for directing a light beam through said disc when at said test station, and photo-responsive means disposed at said station for receiving said light beam upon transmission through said disc and for generating an electrical signal responsive to the light changes caused by rotation of said pattern.

5. Apparatus for testing the coagulation time of a fluid sample which comprises, a carrier member having a bowl portion for carrying the sample to be tested and journals adjacent said bowl portion, said carrier member having a substantially circular configuration and said bowl portion being adjacent the circumference thereof, means for driving said carrier member in intermittent rotary movement having a dwell interval corresponding to the positioning of said bowl portion at a test station, a disc having opposed axles rotatively mounted on said journals for partial immersion of said disc in the fluid sample, said disc having a light transmitting pattern and a magnetically responsive member disposed transverse of said axles, heating means for raising said bowl portion and fluid sample contained therein to a predetermined temperature in the course of rotation to said test station, rotating means magnetically coupled with and urging said disc to rotate at said test station, a light source for directing a light beam through said disc when at said test station, and photo-responsive means disposed at said station for receiving said light beam upon transmission through said disc and for generating an electrical signal responsive to the light changes caused by rotation of said pattern.

6. Apparatus for testing the coagulation time of a fluid sample which comprises, a substantially circularly configured carrier member mounted for rotation about a vertical axis, said carrier member having a bowl formed in a circumferential portion thereof for transporting said fluid sample to be tested and journals disposed oppositely adjacent said bowl, means for rotating said carrier member to bring said bowl into disposition at a test station, a disc having opposite axles rotatively mounted on said journals for partial immersion of said disc in the fluid sample, said disc having a light transmitting pattern and a magnetically responsive member disposed transverse of said axles, heating means for raising said bowl and fluid sample contained therein to a predetermined temperature in the course of rotary transport to said test station, magnetic means disposed at said test station for rotation about an axis substantially colinear with said disc axles at said test station, means for driving said magnetic means to rotate about said axis at a constant speed, said magnetic means being spaced from but magnetically coupled with said magnetically responsive member whereby said disc is urged to rotate in said fluid sample at said constant speed, a light source for directing a light beam through said disc when at said test station, photo-responsive means disposed at said station for receiving said light beam upon transmission through said disc and for generating an electrical signal responsive to the light changes caused by rotation of said pattern, and means for recording said signal with respect to time.

7. Apparatus for testing the coagulation time of a fluid sample which comprises, a substantially circularly configured carrier member mounted for rotation about a vertical axis, said carrier member having a bowl formed in a circumferential portion thereof for transporting said fluid sample to be tested, means for driving said carrier member in an intermittent rotary movement having a dwell interval corresponding to the rotary positioning of said bowl at a test station, a disc having opposed axles rotatively mounted on said journals for partial immersion of said disc in the fluid sample, said disc having a light transmitting pattern and a magnetically responsive member disposed transverse of said axles, heating means for raising said bowl and fluid sample contained therein to a predetermined temperature in the course of rotation to said test station, magnetic means mounted at said test station for rotation about an axis substantially colinear with said disc axles at said test station and magnetically coupled with said magnetically responsive member, means for driving said magnetic means to rotate about said axis at a constant speed whereby said disc is urged to rotation in said fluid sample at said constant speed, a light source for directing a light beam through said patterned disc when said bowl is at said test station, and photo-responsive means disposed at said station for receiving said light beam upon transmission through said disc and generating an electrical signal responsive to the light changes caused by rotation of said pattern.

8. Apparatus as set forth in claim 7 wherein said heating means comprises a blower for directing air through a manifold against the under surface of said bowl in the course of movement to said test station and during said dwell interval and means for heating said directed air in the course of passage from said blower through said manifold.

9. Apparatus as set forth in claim 8 wherein said means for heating said directed air is thermostatically controlled.

10. Apparatus for measuring the coagulation time of a fluid sample whose coagulation is measured from a time that a reactant fluid is introduced into the fluid sample to cause coagulation to the time that the coagulation occurs which comprises, a substantially circularly configured carrier member mounted for rotation about a vertical axis, said carrier member having a bowl formed in a circumferential portion thereof for transporting said fluid sample to be tested and journals disposed oppositely adjacent said bowl, means for rotating said carrier member in an intermittent rotary movement to bring the bowl to a test station and having a dwell interval corresponding to the rotary positioning of said bowl at said test station, means for admitting a coagulating reactant fluid into said bowl portion upon arrival at said test station, a disc having opposite axles mounted on said journals mounted for partial immersion of said disc in the fluid sample, said disc having a light transmitting pattern and a magnetically responsive member disposed transverse of said axles, heating means for raising said bowl and fluid sample contained therein to a predetermined temperature in the course of rotation to said test station, magnetic means at said test station having means rotating same at a constant speed about an axis substantially colinear with said disc axles when said bowl is at said test station, and commencing rotation simultaneously with admission of said reactant fluid, whereby said disc is urged to rotate in said fluid sample at said constant speed, a light source for directing a light beam through said disc when at said test station, photo-responsive means disposed at said station for receiving said light beam upon transmission through said disc and for generating an electrical signal of one character responsive to the light changes caused by rotation of said pattern and of a different character responsive to the stopping of rotation of said disc caused by seizure through coagulation of said fluid, and means for recording said signals on a time basis.

11. Apparatus as set forth in claim 10 wherein said admitting means comprises a heated cylinder member for heating said reactant fluid to a second predetermined temperature upon admission to said bowl.

12. Apparatus as set forth in claim 11 wherein said temperatures correspond substantially to the temperature of the human body.

13. Apparatus as set forth in claim 10 and, in combination therewith, metering means for driving a predetermined amount of reactant fluid through said admitting means.

14. Apparatus as set forth in claim 13 wherein said metering means is responsive to the positioning of said bowl at said test station for driving said predetermined amount of reactant fluid through said admitting means.

15. Apparatus as set forth in claim 13 wherein said admitting means comprises an admitting nozzle, a conduit connecting said nozzle with said metering means, a spirally grooved metal cylinder member, said conduit being disposed in the spiral groove of said cylinder, and second heating means disposed in said cylinder for heating the reactant fluid as it passes through said conduit.

16. Apparatus as set forth in claim 15 wherein the conduit is coordinated with the heat generating ability of said second heating means for raising said reactant fluid to a predetermined temperature in passage to said nozzle.

17. Apparatus as set forth in claim 13 wherein said metering means comprises signal responsive electromagnetic means for driving said reactant fluid to said admitting means, and, in combination therewith, cam operated means for applying an electrical signal to said last named responsive means upon positioning of said bowl at said test station.

18. Apparatus as set forth in claim 17 wherein said metering means includes syringe means for driving a metered amount of reactant fluid contained therein to said admitting means in response to said last named electrical signal.

19. Apparatus for testing the coagulation time of a plurality of blood plasma samples which comprises, a substantially circularly configured carrier member mounted for rotation about a substantially vertical axis, said carrier member having a plurality of like bowls spaced uniformly about circumferential portions of said carrier member and journals positioned oppositely adjacent each bowl of said plurality, the bowls being respectively adapted for transporting a different plasma sample of said plurality of samples, drive means for intermittently rotating said carrier member to position the bowls successively proximate to a test station, a plurality of disc members each having a light transmitting pattern and opposed axles for rotatably mounting said discs respectively on the journals of each bowl, each disc member further having a magnetically responsive member disposed transverse to said axles, a light source for directing a light beam through the disc member which is positioned proximate said test station in a direction substantially parallel to the axles of said last named disc member, a photocell positioned at said test station for receiving light signals from said source and for generating electrical signals in response thereto, and rotating magnetic means at said station adapted to be magnetically coupled with a disc positioned proximate to said station for rotating said proximate positioned disc member about its axles, whereby said electrical signals vary in accordance with the light changes caused by rotation of said disc and eventual stopping of said disc rotation upon coagulation of said sample and seizure of said disc in said bowl.

20. Apparatus as set forth in claim 19 and, in combination therewith, recording means responsive to said electrical signals for producing a time record of variations in said signals.

21. Apparatus as set forth in claim 20 and, in combination therewith, signal responsive means for adding a preassigned volume of reactant coagulating fluid to a plasma sample in that carrier bowl positioned proximate said test station to accelerate coagulation thereof.

22. Apparatus as set forth in claim 21 wherein said adding means includes means for heating said added fluid to a predetermined temperature.

23. Apparatus as set forth in claim 21 wherein said signal responsive means comprises electromagnetically actuated syringe means for driving a metered volume of reactant fluid from said syringe means to reactant fluid admitting means in response to an actuating signal.

24. Apparatus as set forth in claim 23 and, in combination therewith, a reactant fluid reservoir connected in supplying relation with said syringe means, and electromagnetically operated valve means responsive to said actuating signal for isolating said reservoir from said syringe means.

25. Apparatus as set forth in claim 24 wherein said valve means comprises electromagnetic means for connecting said syringe means with said admitting means in response to said actuating signal.

26. Apparatus as set forth in claim 25 wherein said valve means comprises first spring means for isolating said syringe means from said admitting means and second spring means for connecting said reservoir with said syringe means upon termination of said actuating signal.

27. Apparatus as set forth in claim 19 wherein the carrier member bowls are constructed of very thin material for ready transfer of heat from an undersurface to fluid contained therein.

28. Apparatus as set forth in claim 27, and, in combination therewith, an air applying manifold disposed beneath said carrier member and having arrays of ports disposed respectively in correspondence with successive positionings of the bowls of said plurality at said test station and at locations prior thereto, and blower means for applying heated air to said manifold, whereby plasma samples contained in said bowls are established and maintained at a predetermined temperature upon arrival at said test station.

29. Apparatus as set forth in claim 19 wherein said rotating means comprises a magnet member mounted for rotation about an axis substantially colinear with the axle portions of that disc positioned proximate said test station.

30. Apparatus as set forth in claim 29 and, in combination therewith, constant speed drive means for rotating said magnet member, whereby the disc member proximate said test station is urged to constant speed rotation.

31. Apparatus as set forth in claim 30 wherein said drive means for said carrier member comprises a sector gear rotatably arranged in driven relation with said constant speed drive means for periodically engaging driven elements associated with said carrier member.

References Cited by the Examiner

UNITED STATES PATENTS

| | | | |
|---|---|---|---|
| 2,076,816 | 4/37 | Hess | 73—59 |
| 2,280,947 | 4/42 | Gulliksen | 73—59 |
| 2,445,046 | 7/48 | Tinkham | 73—115 |
| 2,563,567 | 8/51 | Wakefield | 73—59 |
| 2,630,707 | 3/53 | Tyler | 73—59 |
| 2,657,572 | 11/53 | Fann | 73—59 |
| 2,679,157 | 5/54 | Carpenter | 73—59 |
| 3,020,748 | 2/62 | Marshall et al. | 73—53 |
| 3,053,078 | 9/62 | Jewett | 73—54 |
| 3,067,646 | 12/62 | Reesen | 73—150 X |

FOREIGN PATENTS

| | | |
|---|---|---|
| 810,242 | 3/59 | Great Britain. |
| 813,735 | 5/59 | Great Britain. |

JOSEPH P. STRIZAK, *Examiner.*

RICHARD C. QUEISSER, *Primary Examiner.*